(12) United States Patent
Ikuta et al.

(10) Patent No.: US 11,927,146 B2
(45) Date of Patent: Mar. 12, 2024

(54) CONTROLLER AND CONTROL METHOD FOR VEHICLE

(71) Applicant: TOYOTA JIDOSHA KABUSHIKI KAISHA, Toyota (JP)

(72) Inventors: Eiji Ikuta, Obu (JP); Masanao Idogawa, Nagoya (JP); Yuho Tokugawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/340,553

(22) Filed: Jun. 23, 2023

(65) Prior Publication Data
US 2023/0417202 A1 Dec. 28, 2023

(30) Foreign Application Priority Data

Jun. 28, 2022 (JP) .................................. 2022-103601

(51) Int. Cl.
*F02D 41/02* (2006.01)
*B60W 20/16* (2016.01)
(Continued)

(52) U.S. Cl.
CPC ......... *F02D 41/023* (2013.01); *F02D 41/029* (2013.01); *B60W 20/16* (2016.01); *B60W 30/194* (2013.01); *B60W 2030/206* (2013.01); *B60W 2510/0619* (2013.01); *B60W 2710/0622* (2013.01); *F01N 3/101* (2013.01); *F01N 3/18* (2013.01); *F01N 2240/00* (2013.01); *F01N 2430/06* (2013.01); *F02D 41/1466* (2013.01); *Y02T 10/12* (2013.01)

(58) Field of Classification Search
CPC .. F02D 41/1466; F02D 41/029; F02D 41/023; B60W 30/194; B60W 2030/206; B60W 2510/0619; B60W 2710/0622; B60W 20/16; F01N 2240/00; Y02T 10/12
See application file for complete search history.

(56) References Cited

U.S. PATENT DOCUMENTS

| 2003/0131593 | A1* | 7/2003 | Asanuma | ............... | F01N 13/009 |
| | | | | | 60/285 |
| 2016/0061317 | A1* | 3/2016 | Nagai | ................... | B60W 10/06 |
| | | | | | 477/115 |

(Continued)

FOREIGN PATENT DOCUMENTS

JP H 05-209677 A 8/1993

*Primary Examiner* — Tinh Dang
(74) *Attorney, Agent, or Firm* — Finnegan, Henderson, Farabow, Garrett & Dunner, LLP

(57) ABSTRACT

A controller is configured to control a vehicle that includes an internal combustion engine and an automatic transmission. The controller is configured to execute a shifting process that switches a gear ratio of the automatic transmission and a lean operation process that operates the internal combustion engine with an air-fuel ratio of the air-fuel mixture in a cylinder leaner than a stoichiometric air-fuel ratio. The controller is further configured to, when executing the shifting process during execution of the lean operation process, set an air-fuel ratio in a case in which the shifting process is being executed to a value closer to the stoichiometric air-fuel ratio than an air-fuel ratio in a case in which the shifting process is not being executed.

4 Claims, 3 Drawing Sheets

(51) Int. Cl.
 _B60W 30/20_ (2006.01)
 _F01N 3/10_ (2006.01)
 _F02D 41/14_ (2006.01)
 _B60W 30/194_ (2012.01)
 _F01N 3/18_ (2006.01)

(56) References Cited

U.S. PATENT DOCUMENTS

2017/0113690 A1* 4/2017 Kim ................. B60W 10/06
2021/0107451 A1* 4/2021 Nose ................ F02D 41/1497

* cited by examiner

CONTROLLER AND CONTROL METHOD FOR VEHICLE

BACKGROUND

1. Field

The present disclosure relates to a controller and a control method for a vehicle.

2. Description of Related Art

Japanese Laid-Open Patent Publication No. 05-209677 discloses an example of an internal combustion engine, an automatic transmission coupled to the internal combustion engine, and a controller that controls them. To operate the internal combustion engine, the controller makes the air-fuel ratio of an air-fuel mixture in a cylinder leaner or richer than the stoichiometric air-fuel ratio. During shifting performed by the automatic transmission, the controller learns parameters related to the shifting.

When the internal combustion engine is operated with the air-fuel ratio of the air-fuel mixture in the cylinder in a lean state, the operating state of the internal combustion engine may be unstable. Specifically, torque fluctuation of the internal combustion engine may increase. The learning related to shifting in such a situation may cause erroneous learning. To solve this problem, upon a shifting request in a situation in which the internal combustion engine is operated with the air-fuel ratio of the air-fuel mixture in the cylinder in a lean state, the controller switches the air-fuel ratio of the air-fuel mixture in the cylinder to a rich state. The controller thus suppresses the torque fluctuation of the internal combustion engine to perform shifting and learning related to the shifting.

A three-way catalyst may be disposed in an exhaust passage of the internal combustion engine. For example, when the amount of oxygen stored in the three-way catalyst decreases, the operation of the internal combustion engine may be continued with the air-fuel ratio of the air-fuel mixture in the cylinder in a lean state so that the supply of oxygen to the three-way catalyst is continued. In addition to erroneous learning, shifting performed by the automatic transmission in such a situation may cause shift shock and torque fluctuation of the internal combustion engine to occur simultaneously so that ride quality for an occupant deteriorates. To cope with such problems, the air-fuel ratio of the air-fuel mixture in the cylinder may be switched to a rich state when the shifting is performed as described in the above publication. In this case, if the three-way catalyst still needs to be supplied with oxygen even after the shifting performed by the automatic transmission is completed, the air-fuel ratio of the air-fuel mixture in the cylinder will be switched to the lean state again. This causes the atmosphere of the catalyst, which had been rich, to become lean again. When the catalyst atmosphere is switched from a rich state to a lean state, deterioration of the catalyst is likely to progress. In this manner, if the air-fuel ratio is switched to a rich state each time the automatic transmission performs shifting in a state in which the air-fuel ratio should be lean, the deterioration of the catalyst may accelerate.

In addition to increasing the amount of oxygen stored in the three-way catalyst, the air-fuel ratio of the air-fuel mixture in the cylinder may be made lean for another purpose. Regardless of the purpose of making the air-fuel ratio of the air-fuel mixture in the cylinder lean, when shifting is performed during operation of the internal combustion engine with the air-fuel ratio of the air-fuel mixture in the cylinder in a lean state, the same problem as described above may occur in a vehicle including an internal combustion engine with a three-way catalyst.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides a controller configured to control a vehicle. The vehicle includes an internal combustion engine and an automatic transmission coupled to the internal combustion engine. The internal combustion engine includes a cylinder in which an air-fuel mixture of fuel and intake air is burned, an exhaust passage connected to the cylinder, and a three-way catalyst located in the exhaust passage. The controller is configured to execute a shifting process that switches a gear ratio of the automatic transmission and a lean operation process that operates the internal combustion engine with an air-fuel ratio of the air-fuel mixture in the cylinder leaner than a stoichiometric air-fuel ratio. The controller is further configured to, when executing the shifting process during execution of the lean operation process, set an air-fuel ratio in a case in which the shifting process is being executed to a value closer to the stoichiometric air-fuel ratio than an air-fuel ratio in a case in which the shifting process is not being executed.

In this configuration, during the execution of the shifting process, the air-fuel ratio in the air-fuel mixture in the cylinder is relatively small. Thus, the torque fluctuation of the internal combustion engine is sufficiently suppressed during the execution of the shifting process. Further, during the execution of the shifting process, the air-fuel ratio in the cylinder is kept leaner than the stoichiometric air-fuel ratio instead of being made richer than the stoichiometric air-fuel ratio. Thus, the catalyst atmosphere is kept leaner than the stoichiometric air-fuel ratio before and after the shifting process is executed. Accordingly, the three-way catalyst is less likely to deteriorate.

Another aspect provides a control method for a vehicle. The vehicle includes an internal combustion engine and an automatic transmission coupled to the internal combustion engine. The internal combustion engine includes a cylinder in which an air-fuel mixture of fuel and intake air is burned, an exhaust passage connected to the cylinder, and a three-way catalyst located in the exhaust passage. The method includes executing a shifting process that switches a gear ratio of the automatic transmission, executing a lean operation process that operates the internal combustion engine with an air-fuel ratio of the air-fuel mixture in the cylinder leaner than a stoichiometric air-fuel ratio, and when executing the shifting process during execution of the lean operation process, setting an air-fuel ratio in a case in which the shifting process is being executed to a value closer to the stoichiometric air-fuel ratio than an air-fuel ratio in a case in which the shifting process is not being executed.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 100 for a vehicle 500 according to an embodiment will now be described with reference to the drawings.

Schematic Configuration of Vehicle

Figure 1:
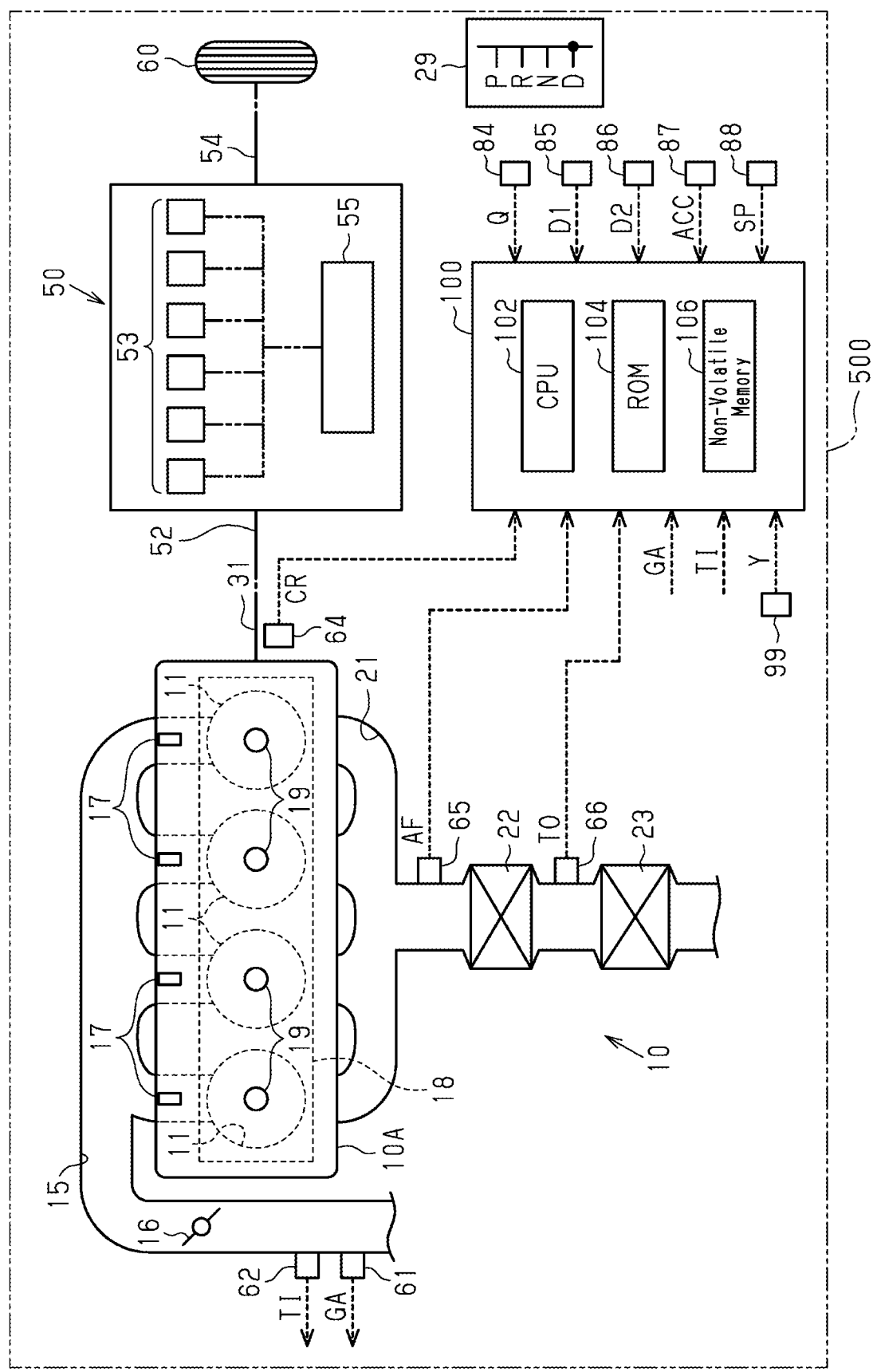
FIG. 1 is a schematic diagram showing the configuration of a vehicle.

As shown in FIG. 1, the vehicle 500 includes an internal combustion engine 10. The internal combustion engine 10 is a driving source of the vehicle 500.

The internal combustion engine 10 includes an engine body 10A and a crankshaft 31. The engine body 10A includes cylinders 11. The number of the cylinders 11 is four. The cylinders 11 are spaces defined in the engine body 10A. The cylinders 11 are spaces for burning an air-fuel mixture of fuel and intake air. Each cylinder 11 accommodates a piston (not shown). Each piston reciprocates in a corresponding cylinder 11, and is coupled to the crankshaft 31 by a corresponding connecting rod. The crankshaft 31 rotates as the piston reciprocates.

The engine body 10A includes a water jacket 18. The water jacket 18 is a passage through which coolant flows. The water jacket 18 is located around the cylinders 11.

The internal combustion engine 10 includes ignition plugs 19, each located in a corresponding cylinder 11. The tip of the ignition plug 19 is located in the cylinder 11. The ignition plug 19 ignites the air-fuel mixture in the cylinder 11.

The internal combustion engine 10 includes an intake passage 15, a throttle valve 16, and fuel injection valves 17. The intake passage 15 is a passage through which intake air is drawn into each cylinder 11. The intake passage 15 is connected to each cylinder 11. The throttle valve 16 is located in the intake passage 15. The open degree of the throttle valve 16 can be adjusted. An amount GA of intake air (hereinafter referred to as an intake air amount GA) changes depending on the open degree of the throttle valve 16.

The fuel injection valves 17 are located downstream of the throttle valve 16 in the intake passage 15. Each fuel injection valve 17 is disposed in a corresponding cylinder 11. The fuel injection valve 17 injects fuel. The fuel injected by the fuel injection valve 17 reaches a corresponding cylinder 11 through the intake passage 15.

The internal combustion engine 10 includes an exhaust passage 21, a three-way catalyst 22, and a gasoline particulate filter 23 (hereinafter simply referred to as a filter 23). The exhaust passage 21 is a passage out of which exhaust gas is discharged from the cylinders 11. The exhaust passage 21 is connected to each cylinder 11.

The three-way catalyst 22 is located in the exhaust passage 21. The three-way catalyst 22 purifies hydrocarbon, carbon monoxide, and nitrogen oxide that are contained in exhaust gas. The three-way catalyst has an oxygen absorption ability to absorb oxygen contained in the exhaust gas. The filter 23 is located downstream of the three-way catalyst 22 in the exhaust passage 21. The filter 23 collects particulate matter (hereinafter referred to as PM) contained in the exhaust gas.

The internal combustion engine 10 includes an air flow meter 61, an intake air temperature sensor 62, a crank position sensor 64, an air-fuel ratio sensor 65, and an exhaust gas temperature sensor 66. The air flow meter 61 is located upstream of the throttle valve 16 in the intake passage 15, and detects the intake air amount GA. The intake air temperature sensor 62 is located upstream of the throttle valve 16 in the intake passage 15.

The intake air temperature sensor 62 detects a temperature TI of intake air. The crank position sensor 64 detects a rotation position CR of the crankshaft 31. The air-fuel ratio sensor 65 is located upstream of the three-way catalyst 22 in the exhaust passage 21, and detects an air-fuel ratio AF of the exhaust gas discharged from each cylinder 11. The exhaust gas temperature sensor 66 is located between the three-way catalyst 22 and the filter 23 in the exhaust passage 21, and detects a temperature TO of the exhaust gas flowing out of the three-way catalyst 22. Each sensor repeatedly outputs a signal corresponding to information detected by the sensor.

The vehicle 500 includes an automatic transmission 50. The automatic transmission 50 is a stepped transmission capable of switching the gear position between multiple stages. The automatic transmission 50 includes an input shaft 52, an output shaft 54, friction engagement elements 53, planetary gear mechanisms (not shown), and a hydraulic circuit 55. The input shaft 52 is coupled to the crankshaft 31. The output shaft 54 is coupled to wheels 60 by a differential, for example.

The friction engagement elements 53 and the planetary gear mechanisms are located between the input shaft 52 and the output shaft 54. The friction engagement elements 53 include clutches and brakes. Specifically, one of the friction engagement elements 53 is a clutch or a brake. Each friction engagement element 53 is switched between a connected state and a disconnected state depending on the hydraulic pressure of the hydraulic circuit 55. For example, each friction engagement element 53 is switched from the disconnected state to the connected state when the hydraulic pressure supplied from the hydraulic circuit 55 increases. The automatic transmission 50 provides one of preset gear positions depending on the connected and disconnected states of the friction engagement elements 53.

The gear positions are forward-traveling gear positions, backward-traveling gear positions, or non-traveling gear positions in which power transmission between the input shaft 52 and the output shaft 54 is blocked. Further, the forward-traveling gear positions include gear positions such as a first speed to a fifth speed. Each gear ratio is set to a different gear position.

The hydraulic circuit 55 includes oil passages (not shown), a pump (not shown) that discharges hydraulic oil to the oil passages, and solenoid valves (not shown) used to switch the oil passage through which hydraulic oil flows. The pump is, for example, electric.

The vehicle 500 includes a shift device 29 that switches a shift range Q of the automatic transmission 50. The shift device 29 includes a shift lever that is operated by an occupant. When a D range is selected by the shift lever, the automatic transmission 50 provides the forward-traveling gear position. When a R range is selected by the shift lever, the automatic transmission 50 provides the backward-traveling gear position. When a N or P range is selected by the shift lever, the automatic transmission 50 provides the non-traveling gear position.

The vehicle 500 includes a shift sensor 84, an accelerator sensor 87, a vehicle speed sensor 88, a first rotation sensor 85, and a second rotation sensor 86. The shift sensor 84 detects the shift range Q selected by the shift device 29. The accelerator sensor 87 detects the depression amount of an accelerator pedal in the vehicle 500 as an accelerator operation amount ACC. The vehicle speed sensor 88 detects a traveling speed of the vehicle 500 as a vehicle speed SP. The first rotation sensor 85 detects a rotation position D1 of the input shaft 52 of the automatic transmission 50. The second rotation sensor 86 detects a rotation position D2 of the output shaft 54. Each sensor repeatedly outputs a signal corresponding to information detected by the sensor.

The vehicle 500 includes an ignition switch 99 that is used to start the vehicle 500. The ignition switch 99 outputs a signal Y corresponding to an operation performed by the driver.

Schematic Configuration of Controller

The controller 100 may include one or more processors that execute various processes in accordance with a computer program (software). The controller 100 may be processing circuitry including one or more dedicated hardware circuits such as application specific integrated circuits (ASICs) that execute at least part of various processes or including a combination thereof. The processor includes a CPU 102 and memories, such as a RAM and a ROM 104. The memory stores program codes or instructions configured to cause the CPU 102 to execute the processes. The memory, or a computer-readable medium, includes any type of media that are accessible by general-purpose computers and dedicated computers. Further, the controller 100 includes an electrically-rewritable non-volatile memory 106.

The controller 100 receives a signal Y from the ignition switch 99. Upon receipt of the signal Y when the ignition switch 99 is turned on, the controller 100 starts the internal combustion engine 10. Hereinafter, a period from when the ignition switch 99 is turned on to when the ignition switch 99 is turned off is referred to as a single trip.

During a single trip, the controller 100 repeatedly receives detection signals from various sensors attached to the vehicle 500. Specifically, the controller 100 receives detection signals related to the following parameters.

Intake air amount GA detected by the air flow meter 61
Temperature TI of intake air detected by the intake air temperature sensor 62
Air-fuel ratio AF detected by the air-fuel ratio sensor 65
Temperature TO of the exhaust gas detected by the exhaust gas temperature sensor 66
Rotation position CR of the crankshaft 31 detected by the crank position sensor 64
Shift range Q detected by the shift sensor 84
Rotation position D1 of the input shaft 52 detected by the first rotation sensor 85
Rotation position D2 of the output shaft 54 detected by the second rotation sensor 86
Accelerator operation amount ACC detected by the accelerator sensor 87
Vehicle speed SP detected by the vehicle speed sensor 88

Based on the received detection signals received from the various sensors, the controller 100 calculates the following parameters when necessary. Based on the rotation position CR of the crankshaft 31, the controller 100 calculates an engine rotation speed NE, which is the rotation speed of the crankshaft 31. Further, the controller 100 calculates an engine load factor KL based on the engine rotation speed NE and the intake air amount GA.

The engine load factor KL is a parameter that determines the amount of air with which the cylinder 11 is filled, and is a value obtained by dividing the amount of air flowing into one cylinder 11 per combustion cycle by a reference air amount. The reference air amount changes depending on the engine speed NE.

One combustion cycle is a series of periods in which one cylinder 11 enters each of the intake stroke, the compression stroke, the expansion stroke, and the exhaust stroke. The controller 100 calculates a rotation position D1 of the input shaft 52 based on the rotation position N1 of the input shaft 52. The controller 100 calculates a rotation speed D2 of the output shaft 54 based on the rotation position N2 of the output shaft 54.

Processed Related to Automatic Transmission

The controller 100 controls the automatic transmission 50. The controller 100 controls the automatic transmission 50 such that the gear position of the automatic transmission 50 is based on the shift range Q selected by the shift device 29. When the shift range Q selected by the shift device 29 is the D range, the controller 100 performs the following processes. When the shift range Q selected by the shift device 29 is the D range, the controller 100 continues to perform a gear position calculation process.

The gear position calculation process is a process that calculates a target gear position. The controller 100 stores a shift map in advance as information used to calculate the target gear position. The shift map represents the target gear position, which should be set by the automatic transmission 50 in the current traveling state of the vehicle 500, in association with the vehicle speed SP and the accelerator operation amount ACC.

In the gear position calculation process, the controller 100 repeatedly calculates the target gear position corresponding to the latest vehicle speed SP and the latest accelerator operation amount ACC based on the shift map.

When the target shift speed calculated in the shift speed calculation process is switched (i.e., when the previous target gear position is different from the latest target gear position), the controller 100 executes a shifting process. The shifting process is a process that switches the gear position of the automatic transmission 50.

To switch the gear position, one of the friction engagement elements 53 to be brought into the connected state and one of the friction engagement elements 53 to be brought into the disconnected state are changed. Thus, in a case in which the shifting process is started after the target gear position is shifted, the controller 100 changes the hydraulic pressure supplied to the friction engagement element 53 that needs to be switched between the connected state and the disconnected state so that the gear position is changed from the current gear position to the target gear position.

To change the hydraulic pressure, the controller 100 calculates an instructed hydraulic pressure for the targeted friction engagement element 53 and controls the pump and the solenoid valves of the hydraulic circuit 55 based on the instructed hydraulic pressure. As a result, the controller 100 changes the hydraulic pressure for the targeted friction engagement element 53. The controller 100 increases the hydraulic pressure supplied to the friction engagement element 53 that is to be brought into the connected state.

The controller 100 decreases the hydraulic pressure supplied to the friction engagement element 53 that is to be brought into the disengaged state. In this manner, the friction engagement element 53 is switched between the connected state and the disconnected state depending on a change in the hydraulic pressure. Further, when the friction engagement element 53 is switched between the connected state and the disconnected state, the rotation speed N1 of the input shaft 52 changes to a rotation speed corresponding to the latest target shift speed.

The controller 100 determines that shifting is completed when the rotation speed N1 of the input shaft 52 matches the rotation speed corresponding to the latest target gear position. The rotation speed corresponding to the latest target gear position is obtained by multiplying the speed ratio corresponding to the target gear position by the rotation speed N2 of the output shaft 54. When the controller 100 determines that the shifting is completed, the controller 100 ends the shifting process.

The controller 100 turns on a shift execution flag when the shifting process is being executed. The controller 100 turns off the shift execution flag when the shifting process is not being executed.

When the shifting process is completed, the controller 100 executes a learning process. In different hydraulic circuits 55, there are variations in their ability to respond to the instructed hydraulic pressure due to, for example, a tolerance for each product and deterioration over time. The learning process is a process that calculates an optimum correction value used to compensate for such an individual difference. In the learning process, the controller 100 calculates a correction value of the instructed hydraulic pressure, for example, based on whether the time required for shifting in the shifting process and a reference time is longer and based on the average value of a target torque of the internal combustion engine 10 during the execution of the shifting process. The controller 100 reflects the calculated correction value on the instructed hydraulic pressure of the next shifting process.

Processes Related to Internal Combustion Engine

The controller 100 controls the internal combustion engine 10. The controller 100 can execute an engine operation process that operates the internal combustion engine 10. In the engine operation process, the controller 100 calculates the target torque based on parameters (e.g., the accelerator operation amount ACC and the vehicle speed SP). Then, the controller 100 sets control target values for various parts of the internal combustion engine 10 (e.g., the throttle valve 16, the fuel injection valve 17, and the ignition plug 19) to obtain the target torque. The controller 100 controls the various parts of the internal combustion engine 10 based on these control target values. That is, the controller 100 adjusts the open degree of the throttle valve 16 to match a target open degree, causes the fuel injection valve 17 to inject a target injection amount of fuel, and causes the ignition plug 19 to ignite at a target ignition timing.

In the engine operation process, the controller 100 repeatedly sets each control target value and controls the various parts based on the control target value. In this manner, the controller 100 repeatedly causes the air-fuel mixture in each cylinder 11 to burn. That is, the controller 100 operates the internal combustion engine 10. To calculate each control target value, the controller 100 takes a target air-fuel ratio into consideration. The controller 100 increases or decreases the target injection amount for each cylinder 11 per combustion cycle in correspondence with the target open degree of the throttle valve 16 such that the air-fuel ratio AF of the air-fuel mixture in each cylinder 11 matches the target air-fuel ratio while achieving the target torque. Hereinafter, the air-fuel ratio AF of the air-fuel mixture in the cylinder 11 will be simply referred to as the air-fuel ratio AF in the cylinder 11.

The engine operation process includes a normal operation process, a heating process, and a lean operation process. To operate the internal combustion engine 10 during a single trip, the controller 100 generally performs the normal operation process. In the normal operation process, the controller 100 generally sets the target air-fuel ratio to a stoichiometric air-fuel ratio AFS. The heating process and the lean operation process will be described later.

Deposition Amount Calculation Process

When the operation of the internal combustion engine 10 is continued, a deposition amount W of PM trapped by the filter 23 (hereinafter simply referred to as a PM deposition amount) gradually increases. The controller 100 continues to perform a deposition amount calculation process that calculates the PM deposition amount W during a single trip. In the deposition amount calculation process, the controller 100 repeatedly calculates the PM deposition amount W. To calculate the PM accumulation amount W, the controller 100 first calculates a PM generation amount and a PM regeneration amount.

Next, the controller 100 calculates a value obtained by subtracting the PM regeneration amount from the PM generation amount as an updated value. Then, the controller 100 adds the updated value to the previous value of the PM deposition amount W stored in the non-volatile memory 106. The controller 100 calculates the obtained value as the latest PM deposition amount W. After calculating the latest PM deposition amount W, the controller 100 overwrites the previous value stored in the non-volatile memory 106 with the latest PM deposition amount W.

The PM generation amount is the amount of PM generated when the air-fuel mixture in the cylinder 11 burns. The controller 100 calculates the PM generation amount based on parameters, such as the intake air amount GA and the fuel injection amount.

The PM regeneration amount is the amount of PM burned in the filter 23. When exhaust gas containing oxygen flows into the filter 23 in a state in which a filter temperature TF, which is the temperature of the filter 23, is greater than or equal to the ignition point of the PM, the PM accumulated in the filter 23 burns. Since oxygen is required for burning PM, the amount of PM burned in the filter 23 is determined based on the amount of oxygen in the exhaust gas flowing into the filter 23.

The controller 100 accordingly calculates the PM regeneration amount based on the oxygen concentration of the exhaust gas flowing into the filter 23 and the filter temperature TF. The controller 100 calculates the oxygen concentration of the exhaust gas based on the air-fuel ratio AF detected by the air-fuel ratio sensor 65. The controller 100 calculates the filter temperature TF using a heat balance model of the filter 23 based on parameters, such as the temperature and the flow rate of the exhaust gas flowing into the filter 23 and the temperature of outside air.

The temperature TO of the exhaust gas detected by the exhaust gas temperature sensor 66 can be used as the temperature of the exhaust gas flowing into the filter 23. The flow rate of the exhaust gas flowing into the filter 23 can be obtained from the intake air amount GA and the fuel injection amount. The temperature TI of the intake air detected by the intake air temperature sensor 62 can be used as the temperature of the outside air.

Specified Process

The controller 100 can execute a specified process. The specified process of the present embodiment is a process that burns and removes the PM trapped in the filter 23 from the filter 23. The specified process includes the heating process and the lean operation process. The heating process is performed before the lean operation process. The heating process is a process that raises the filter temperature TF. The lean operation process is a process that supplies oxygen to the filter 23. By supplying oxygen to the filter 23 that has been heated to a relatively high temperature by the heating process, the PM trapped in the filter 23 is burned and removed.

In the heating process, the controller 100 sets the target ignition timing to a timing retarded from a basic ignition timing and operates the internal combustion engine 10. When the ignition timing is retarded, the conversion efficiency of thermal energy generated by the combustion of the air-fuel mixture in the cylinder 11 into mechanical energy is lowered. Further, the thermal energy transferred to exhaust gas increases. Thus, the exhaust gas is likely to have a relatively high temperature. When the high-temperature exhaust gas reaches the three-way catalyst 22 and then the filter 23, the filter temperature TF is raised to a temperature greater than or equal to the ignition point of PM.

The basic ignition timing is, for example, a maximum brake torque (MBT) ignition timing. At the MBT ignition timing, the maximum torque can be obtained at the current engine rotation speed NE and engine load factor KL.

In the lean operation process, the controller 100 operates the internal combustion engine 10 with the air-fuel ratio AF in each cylinder 11 leaner than the stoichiometric air-fuel ratio AFS. The controller 100 can execute an air-fuel ratio setting process that sets the target air-fuel ratio during execution of the lean operation process.

In the air-fuel ratio setting process, the controller 100 sets the air-fuel ratio to be different when the shifting process is being executed and when the shifting process is not being executed. The controller 100 sets the target air-fuel ratio in a case in which the shifting process is being executed to a value closer to the stoichiometric air-fuel ratio AFS than the target air-fuel ratio in a case in which the shifting process is not being executed. The stoichiometric air-fuel ratio AFS is, for example, 14.6.

The controller 100 sets, to a first value A1, the target air-fuel ratio in the case in which the shifting process is not being executed. The first value A1 is, for example, 15.2. The controller 100 sets, to a second value A2, the target air-fuel ratio in the case in which the shifting process is being executed. The second value A2 is closer to the stoichiometric air-fuel ratio AFS than a median value between the stoichiometric air-fuel ratio AFS and the first value A1. The second value A2 is, for example, 14.7. The first value A1 is determined in advance through, for example, an experiment or a simulation as the air-fuel ratio AF at which the amount of oxygen suitable for expediting the combustion of PM can be supplied. The second value A2 is determined in advance through, for example, an experiment or a simulation as the air-fuel ratio AF at which the torque fluctuation of the internal combustion engine 10 is suppressed to substantially the same degree as in the case of the stoichiometric air-fuel ratio AFS. The controller 100 stores the first value A1 and the second value A2 in advance.

Detailed Processing Content of Specified Process

The controller 100 repeats the specified process during a single trip. The controller 100 cancels the normal operation process while executing the heating process and the lean operation process in the specified process.

Figure 2:
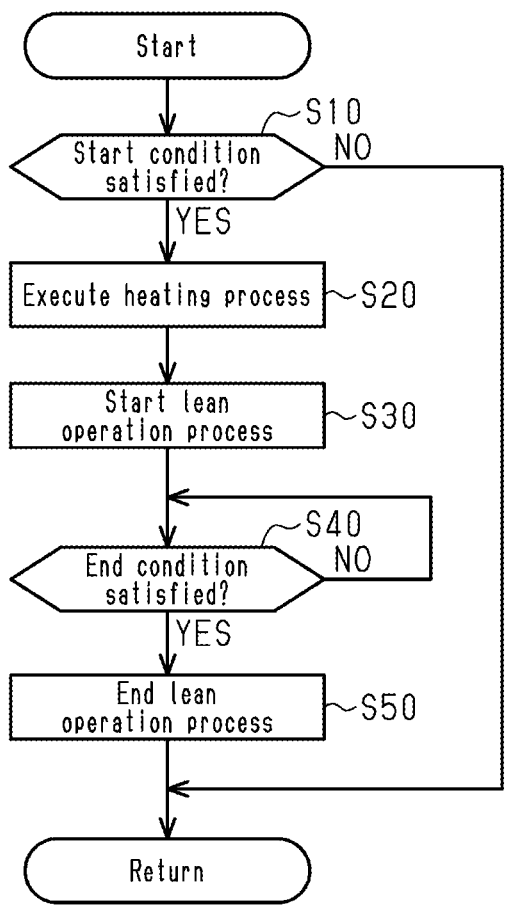
FIG. 2 is a flowchart illustrating a procedure for a specified process.

As shown in FIG. 2, when starting the specified process, the controller 100 first performs the process of step S10. In step S10, the controller 100 determines whether a start condition is satisfied. The start condition is that the latest PM deposition amount W is greater than or equal to a start specified value. The controller 100 stores the start specified value in advance. The start specified value is determined in advance through, for example, an experiment or a simulation as a value at which the PM deposition amount W is so large that the PM needs to be removed from the filter 23.

The controller 100 determines whether the start condition is satisfied based on whether the latest PM deposition amount W or the start specified value is larger. When the start condition is not satisfied (step S10: NO), the controller 100 temporarily ends the series of processes of the specified process. Then, the controller 100 executes the process of step S10 again.

When the start condition is satisfied in step S10 (step S10: YES), the controller 100 advances the process to step S20. Step S10 is YES in the following situation. The PM deposition amount W is less than the start specified value in step S10 when the previous specified process was executed, and the PM deposition amount W is greater than or equal to the start specified value at step S10 when the current specified process is executed. This indicates that the PM deposition amount W has increased to the start specified value during a period from the previous execution of the specified process to the current execution of the specified process. That is, the controller 100 advances the process to step S20 and its subsequent steps on condition that the PM deposition amount W has increased to the start specified value.

In step S20, the controller 100 executes the heating process for a specific period. That is, the controller 100 sets the target ignition timing to a specific ignition timing and repeats combustion of the air-fuel mixture in each cylinder 11. The specific ignition timing is retarded from the basic ignition timing by a specific retardation amount. The specific retardation amount and the specific period are determined in advance in association with each other through, for example, an experiment or a simulation as values necessary for increasing the filter temperature TF to a specific temperature or higher. The specific temperature is determined in advance as a temperature higher than the ignition point of PM.

The controller 100 stores the specific retardation amount, the specific period, and the specific temperature in advance. In the heating process, the controller 100 sets the target air-fuel ratio to the stoichiometric air-fuel ratio AFS. When the process is advanced to step S20 and then the specific period elapses, the controller 100 ends the heating process. Then, the controller 100 ends the process of step S20. Subsequently, the controller 100 advances the process to step S30.

In step S30, the controller 100 starts the lean operation process. That is, from this point, the controller 100 repeats combustion of the air-fuel mixture in each cylinder 11 using a value to which the target air-fuel ratio is set in the air-fuel ratio setting process. The controller 100 sets the target open degree of the throttle valve 16 and the target injection amount for each cylinder 11 such that the air-fuel ratio AF in each cylinder 11 becomes the first value A1 or the second value A2.

In the lean operation process, the controller 100 sets the target ignition timing to the specific ignition timing in the same manner as the heating process. When starting the lean operation process, the controller 100 turns on the lean execution flag and then advances the process to step S40.

In step S40, the controller 100 determines whether an end condition is satisfied. The end condition is that at least one of the following two requirements is satisfied. A first requirement is that the latest PM deposition amount W is less than or equal to an end specified value. A second requirement is that the filter temperature TF is less than or equal to the specific temperature. The end specified value is determined in advance through, for example, an experiment or a simulation as a value at which the PM deposition amount W is sufficiently small and thus the lean operation process can be ended. The controller 100 stores the end specified value in advance. The end specified value is smaller than the start specified value. The controller 100 determines whether the first requirement is satisfied based on whether the latest PM deposition amount W or the end specified value is larger.

Further, the controller 100 determines whether the second requirement is satisfied based on whether the latest filter temperature TF calculated during calculation of the PM deposition amount W and the specific temperature is greater. When the end condition is not satisfied (step S40: NO), the controller 100 executes the process of step S40 again. The controller 100 repeats the process of step S40 until the end condition is satisfied. When the end condition is satisfied (step S40: YES), the controller 100 advances the process to step S50.

In step S50, the controller 100 ends the lean operation process and turns off the lean execution flag. Then, the controller 100 temporarily ends the series of processes of the specified process. Subsequently, the controller 100 executes the process of step S10 again.

Air-Fuel Ratio Setting Process

The controller 100 repeats the air-fuel ratio setting process when the lean operation process is being executed: that is, when the lean execution flag is on.

Figure 3:
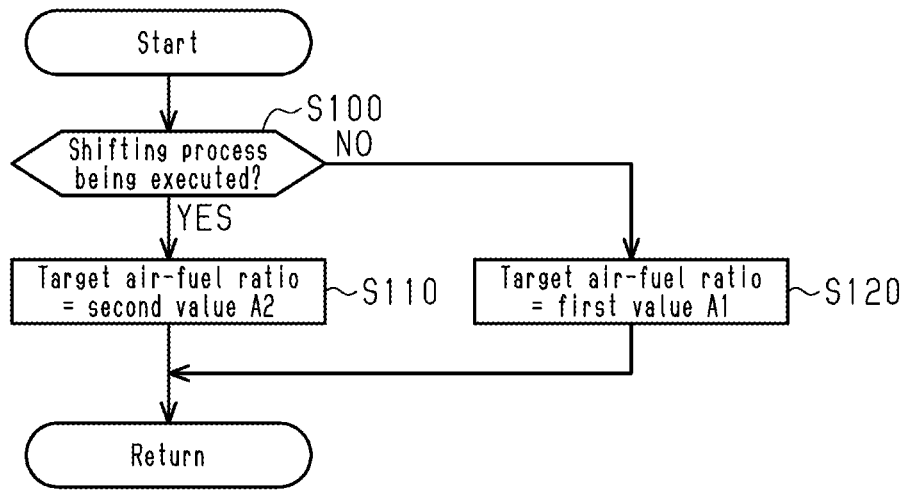
FIG. 3 is a flowchart illustrating a procedure for an air-fuel ratio setting process.

As shown in FIG. 3, when starting the air-fuel ratio setting process, the controller 100 first executes the process of step S100. In step S100, the controller 100 determines whether the shifting process is being executed. The controller 100 makes this determination based on the setting status of the shift execution flag. When the shift execution flag is off (i.e., when the shifting process is not being executed) (step S100: NO), the controller 100 advances the process to step S120. In this case, in step S120, the controller 100 sets the target air-fuel ratio to the first value A1.

When the shift execution flag is off in step S100 (i.e., when the shifting process is being executed) (step S100: YES), the controller 100 advances the process to step S110. In this case, in step S110, the controller 100 sets the target air-fuel ratio to the second value A2. After executing step S110 or step S120, the controller 100 temporarily ends the series of processes of the air-fuel ratio setting process. Then, the controller 100 quickly executes the process of step S100.

Operation of Embodiment

Figure 4:
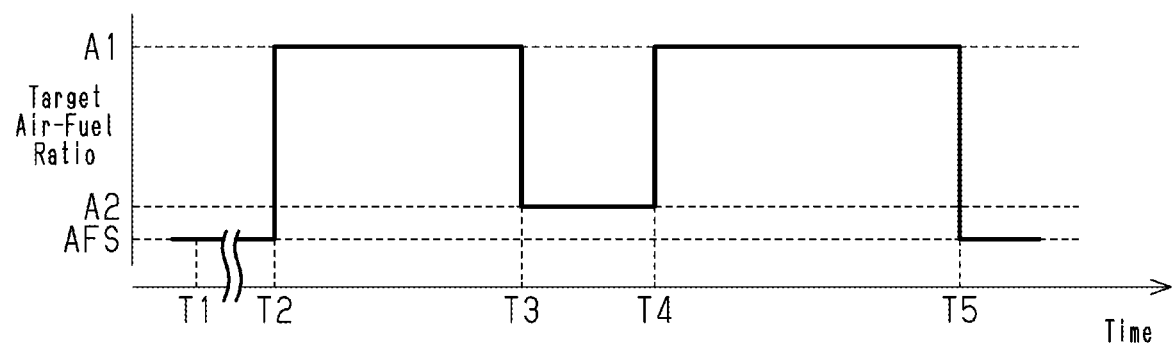
FIG. 4 is a timing diagram illustrating an example of changes in the target air-fuel ratio.

As shown in FIG. 4, when the PM deposition amount W increases to the start specified value at time T1 during a single trip, the controller 100 executes the heating process for the specific period. This causes the filter temperature TF to increase to the specific temperature or higher at time T2, at which the specific period has elapsed from time T1. Until time T2, the controller 100 causes the air-fuel mixture to burn with the air-fuel ratio AF in each cylinder 11 set to the stoichiometric air-fuel ratio AFS.

At time T2, the controller 100 starts the lean operation process. In a case in which the controller 100 is not performing the shifting process, the controller 100 causes the air-fuel mixture to burn with the air-fuel ratio AF in each cylinder 11 set to the first value A1, which is leaner than the stoichiometric air-fuel ratio AFS. Since the air-fuel ratio AF in each cylinder 11 is leaner than the stoichiometric air-fuel ratio AFS, the exhaust gas discharged from the cylinder 11 to the exhaust passage 21 contains a relatively large amount of oxygen. When the oxygen reaches the filter 23, the PM deposited on the filter 23 burns. Then, the PM deposition amount W gradually decreases.

In a case in which the target gear position is switched at the subsequent time T3 and then the controller 100 executes the shifting process from time T3 to time T4, the controller 100 causes the air-fuel mixture to burn with the air-fuel ratio AF in each cylinder 11 set to the second value A2, which is closer to the stoichiometric air-fuel ratio AFS than the first value A1, from time T3 to time T4. Although the proportion of oxygen contained in the exhaust gas at this time is smaller than that before time T3, the air-fuel ratio AF in each cylinder 11 is leaner than the stoichiometric air-fuel ratio AFS. Thus, the exhaust gas still contains oxygen. Accordingly, the oxygen reaches the filter 23 from time T3 to time T4. Then, the PM continues to burn.

Subsequent to time T4, at which the shifting process ends, the controller 100 sets the air-fuel ratio AF in each cylinder 11 to the first value A1 again and causes the air-fuel mixture to burn. This increases the proportion of oxygen contained in the exhaust gas. Then, the combustion of PM and the removal of PM in the filter 23 progress. When the PM deposition amount W eventually decreases to the end specified value at time T5, the controller 100 ends the lean operation process. Subsequently, the controller 100 causes the air-fuel mixture to burn with the air-fuel ratio AF in each cylinder 11 set to the stoichiometric air-fuel ratio AFS.

The ratio of the execution period of the shifting process to the execution period of the lean combustion process and the execution timing of the shifting process in FIG. 4 are merely examples, and do not necessarily coincide with actual ones.

Advantages of Embodiment (1) In the example shown in FIG. 4, the controller 100 makes the air-fuel ratio AF in each cylinder 11 leaner and causes the air-fuel mixture to burn from time T3 to time T4, during which the shifting process is executed. Thus, the torque fluctuation of the internal combustion engine 10 is sufficiently suppressed during the execution of the shifting process. This prevents the occurrence of various problems that would be caused by an increase in the torque fluctuation of the internal combustion engine 10 during the execution of the shifting process. Examples of the various problems include erroneous learning in the learning process related to shifting and deterioration of ride quality for the occupant due to the shift shock and the torque fluctuation of the internal combustion engine 10 that occur simultaneously.

To suppress the torque fluctuation of the internal combustion engine 10 from time T3 to time T4, during which the shifting process is executed, the air-fuel ratio AF in each cylinder 11 may be made richer than the stoichiometric air-fuel ratio AFS. In this case, the regeneration of the filter 23 is suspended during the execution of the shifting process. At time T4, when the shifting process ends, the air-fuel ratio AF in the cylinder 11 is returned to the first value A1, which is leaner than the stoichiometric air-fuel ratio AFS. As a result, the regeneration of the filter 23 is resumed. In this case, the air-fuel ratio AF in each cylinder 11 switches from a richer state to a leaner state than the stoichiometric air-fuel ratio AFS.

This causes the deterioration of the three-way catalyst 22 to progress in the manner described below. When the air-fuel ratio AF in each cylinder 11 is switched from a rich state to a lean state so that the air-fuel mixture burns, a change occurs in the atmosphere in the three-way catalyst 22 into which the exhaust gas discharged from each cylinder 11 flows. That is, as the air-fuel ratio AF in each cylinder 11 is made rich and then switched to a lean state, the catalyst atmosphere that has been richer than the stoichiometric air-fuel ratio AFS is changed to a lean state. When the catalyst atmosphere becomes rich, the three-way catalyst 22 releases oxygen. Thus, the amount of oxygen stored in the three-way catalyst 22 decreases. When the catalyst atmosphere is switched to a lean state in this situation, the amount of oxygen newly drawn in by the three-way catalyst 22 (the amount of oxygen newly stored in the three-way catalyst 22) increases.

In the situation at time T4, the temperature of the three-way catalyst 22 is relatively high due to the previous temperature increasing process. When a relatively large amount of oxygen is drawn in under a high-temperature environment, the oxygen storage ability of the three-way catalyst 22 tends to decrease; that is, the three-way catalyst 22 tends to deteriorate.

In the present embodiment, from time T3 to time T4, during which the shifting process is executed, the air-fuel mixture is burned with the air-fuel ratio AF in each cylinder 11 kept leaner than the stoichiometric air-fuel ratio AFS instead of being made richer than the stoichiometric air-fuel ratio AFS.

Thus, the catalyst atmosphere is kept leaner than the stoichiometric air-fuel ratio AFS before and after the shifting process is executed. When the catalyst atmosphere is kept lean, the amount of oxygen newly stored by the three-way catalyst 22 gradually decreases. In this case, the oxygen storage ability of the three-way catalyst 22 is less likely to decrease.

Accordingly, the present embodiment suppresses the torque fluctuation of the internal combustion engine 10 and the deterioration of the three-way catalyst 22 during execution of the shifting process.

(2) As described in the Operation section, the controller 100 keeps the air-fuel ratio AF in each cylinder 11 lean and causes the air-fuel mixture to burn during time T3 to time T4, during which the shifting process is performed in the lean operation process. This allows the supply of oxygen to the filter 23 to continue from time T3 to time T4. Accordingly, the regeneration of the filter 23 is quickly completed.

(3) From time T3 to time T4, during which the shifting process is performed, the controller 100 sets the air-fuel ratio AF in each cylinder 11 to the second value A2. The second value A2 is closer to the stoichiometric air-fuel ratio AFS than a median value between the first value A1, which is set when the shifting process is not being executed, and the stoichiometric air-fuel ratio AFS. That is, the air-fuel ratio AF in the cylinder 11 is as close as possible to the stoichiometric air-fuel ratio AFS from time T3 to time T4. Accordingly, the torque fluctuation of the internal combustion engine 10 is favorably suppressed from time T3 to time T4.

Modifications

The above embodiment may be modified as follows. The above embodiment and the following modifications can be combined as long as the combined modifications remain technically consistent with each other.

The first value A1 and the method for determining the first value A1 are not limited to the examples of the above embodiment. The first value A1 only needs to be leaner than the stoichiometric air-fuel ratio AFS. As described in the following modification, there may be a case in which the lean operation process is performed to regenerate the filter 23. In view of the purpose of the lean operation process, the first value A1 only needs to be set to an appropriate value.

The second value A2 and the method for determining the second value A2 are not limited to the examples of the above embodiment. The second value A2 may be leaner than a median value between the stoichiometric air-fuel ratio AFS and the first value A1. The second value A2 only needs to be closer to the stoichiometric air-fuel ratio AFS than the first value A1. If the second value A2 is closer to the stoichiometric air-fuel ratio AFS than the first value A1, the torque fluctuation of the internal combustion engine 10 is suppressed when the shifting process is being executed as compared to when the shifting process is not being executed.

The target air-fuel ratio during execution of the lean operation process and during execution of the shifting process does not have to be a constant value, and may be changed depending on the situation. For example, a different target air-fuel ratio may be set each time the shifting process is executed. Further, the target air-fuel ratio may be gradually changed during execution of one shifting process. The target air-fuel ratio obtained when the shifting process is being executed may be closer to the stoichiometric air-fuel ratio AFS than the target air-fuel ratio obtained when the shifting process is not being executed, which is a period before and after the execution of the shifting process.

The target air-fuel ratio obtained when the lean operation process is being executed and when the shifting process is not being executed does not have to be a constant value, and may be changed depending on the situation.

For example, when the target air-fuel ratio is changed depending on the situation, a final target air-fuel ratio may be calculated by correcting a base value of the target air-fuel ratio using a correction value. In this case, if a map representing the relationship between parameters and correction values is created in advance such that the parameters serve as indices that indicate various situations, correction values corresponding to the various situations are determined in a favorable manner. Examples of the parameters may include the engine rotation speed NE and the engine load factor KL.

The content of the lean operation process is not limited to that in the above embodiment. In the lean operation process, the internal combustion engine 10 only needs to be operated with the air-fuel ratio AF in each cylinder 11 leaner than the stoichiometric air-fuel ratio AFS. In a state in which the air-fuel ratio AF in each cylinder 11 is leaner than the stoichiometric air-fuel ratio AFS, the air-fuel ratio AF does not have to be lean in all the cylinders 11. That is, in this state, in a series of periods in which the cylinders 11 enter the combustion stroke (e.g., one combustion cycle), the average value of the air-fuel ratios AF of the cylinders 11 entering the combustion stroke in the period is leaner than the stoichiometric air-fuel ratio AFS.

From this perspective, the cylinders 11 may each have a different air-fuel ratio AF. For example, the air-fuel ratios AF of some of the four cylinders 11 may be made richer than the stoichiometric air-fuel ratio AFS and the air-fuel ratio AF of the remaining cylinders 11 may be made leaner than the stoichiometric air-fuel ratio AFS so that the air-fuel mixture is burned in each cylinder 11. When the air-fuel ratio AF is made different among the cylinders 11, the air-fuel mixture may be burned in some of the four cylinders 11 and the combustion of air-fuel mixture may be stopped in the remaining cylinders 11. The air-fuel ratios AF of the cylinders 11 in which the air-fuel mixture is burned may be made richer than the stoichiometric air-fuel ratio AFS.

When the air-fuel ratio AF is made different among the cylinders 11 in such a manner, a cycle air-fuel ratio, which is the average value of the air-fuel ratios AF of the cylinders 11 in one combustion cycle, only needs to satisfy the following condition. The cycle air-fuel ratio obtained when the lean operation process is being executed and when the shifting process is being executed only needs to be closer to the stoichiometric air-fuel ratio AFS than the cycle air-fuel ratio obtained when the lean operation process is being executed and when the shifting process is not being executed.

As described in the above modification, in the lean operation process, the combustion of the air-fuel mixture in each cylinder 11 may be stopped. In this case, if the engine speed NE is kept larger than 0, the internal combustion engine 10 is operated. That is, in the lean operation process, the engine rotation speed NE only needs to be kept larger than 0 in the condition of the air-fuel ratio AF described in the above modification.

The heating process does not have to be performed. When the air-fuel ratio AF is made different among the cylinders 11 in the lean operation process as in the above modification, a temperature increase in the filter 23 and the supply of oxygen to the filter 23 can both be performed. That is, when the air-fuel ratio AF is made different among the cylinders 11, the cylinder 11 of which the air-fuel ratio AF is made richer than the stoichiometric air-fuel ratio AFS discharges unburned fuel to the exhaust passage 21.

The cylinder 11 of which the air-fuel ratio AF is made leaner than the stoichiometric air-fuel ratio AFS discharges oxygen to the exhaust passage 21. When the unburned fuel and oxygen reach the three-way catalyst 22, the unburned fuel is burned in the three-way catalyst 22. Then, the temperature of the exhaust gas rises. When high-temperature exhaust gas reaches the filter 23, the temperature of the filter 23 increases. In this state, when the oxygen discharged to the exhaust passage 21 from the cylinder 11 of which the air-fuel ratio AF is leaner than the stoichiometric air-fuel ratio AFS reaches the filter 23, the PM is burned in the filter 23.

Based on such a process, when the air-fuel ratio AF is made different among the cylinders 11 in the lean operation process, the heating process may be omitted and only the lean operation process may be executed.

The start condition of the specified process is not limited to the example of the above embodiment. For example, the start condition may have requirements including a requirement in which the PM deposition amount W has increased to the start specified value. When the requirements are all satisfied, it may be determined that the start condition is satisfied. For example, the requirements of the start condition may include a requirement in which the temperature of coolant flowing through the water jacket 18 is greater than or equal to a predetermined warm-up completion temperature of the internal combustion engine 10. In this case, a temperature sensor that detects the temperature of the coolant is provided in the internal combustion engine 10.

The end condition of the specified process is not limited to the example of the above embodiment. For example, instead of or in addition to the requirements of the end condition in the above embodiment, a requirement in which the time elapsed from the start of the lean operation process has exceeded a set time may be employed.

As in the following modification, the purpose of the lean operation process is not limited to the regeneration of the filter 23. The start condition and the end condition of the specified process may be determined based on, for example, the purpose of the lean operation process.

The purpose of performing the lean operation process and consequently performing the specified process is not limited to the regeneration of the filter 23. For example, when the oxygen storage amount of the three-way catalyst 22 decreases, the lean operation process may be performed to supply oxygen to the three-way catalyst 22. When the lean operation process is performed, oxygen can be supplied to the exhaust passage 21. In consideration of such effects obtained from the lean operation process, the lean operation process only needs to be performed as necessary. The necessity of the heating process only needs to be determined depending on the purpose of the lean operation process.

The shifting process does not have to be performed when the forward-traveling gear position is switched. That is, the gear shifting process may include a process that switches from the forward-traveling gear position to the backward-traveling gear position or vice versa.

Similarly, the gear shifting process may include a process that switches between the non-traveling gear position and another gear position. The target air-fuel ratio during the execution of the lean operation process (e.g., during the execution of the shifting process that switches from the forward-traveling gear position to the backward-traveling gear position) may be closer to the stoichiometric air-fuel ratio than the target air-fuel ratio in a case in which the shifting process is not being executed. Thus, the shifting process is not limited to the example of the above embodiment. The shifting process only needs to be a process that switches the gear ratio.

The method for determining to start and end the shifting process is not limited to the example of the above embodiment. If the shifting process can be started in a situation in which shifting is required, any method for determining to start the shifting process may be employed. Similarly, if the shifting process can be ended at the completion of shifting, any method for determining to end the shifting process may be employed.

The content of the learning process is not limited to the example of the above embodiment. In the learning process, the parameters related to shifting only need to be learned based on information obtained during the shifting such that the automatic transmission 50 can be properly operated. The parameter related to shifting may be, for example, a time at which the hydraulic pressure starts to be changed after the target gear position is switched. Multiple parameters may be learned in a single learning process.

The method for calculating the PM deposition amount W is not limited to the example of the above embodiment. Any calculation method may be employed if the PM deposition amount W can be properly calculated. For example, the method for calculating the filter temperature TF used to calculate the PM deposition amount W may be changed from the example of the above embodiment.

Specifically, the filter temperature TF may be calculated without using a detection value of the exhaust gas temperature sensor 66. For example, the filter temperature TF may be calculated by calculating a base value of the filter temperature TF based on the engine operating state (e.g., the engine rotation speed NE and the engine load factor KL) and adjusting the base value in consideration of, for example, the ignition timing.

The configuration of the internal combustion engine 10 is not limited to the example of the above embodiment. For example, the number of the cylinders 11 may be changed. Two three-way catalysts may be provided upstream of the filter 23 in the exhaust passage 21. If the detection value of the exhaust gas temperature sensor 66 is not used to calculate the filter temperature TF as in the above modification, the exhaust gas temperature sensor 66 does not have to be used. The internal combustion engine only needs to include cylinders, an exhaust passage connected to the cylinders, and a three-way catalyst located in the exhaust passage.

The overall configuration of the vehicle 500 is not limited to the example of the above embodiment. The vehicle only needs to include an internal combustion engine and an automatic transmission coupled to the automatic transmission. The automatic transmission may be a continuously variable transmission.

Further, the vehicle may be a hybrid electric vehicle including an internal combustion engine and a motor generator as driving sources. The lean operation process may be executed for such a vehicle. When the shifting process is executed during the execution of the lean operation process, the air-fuel ratio in the cylinder during the execution of the shifting process may be set to a value closer to the stoichiometric air-fuel ratio than the air-fuel ratio in the cylinder in a case in which the shifting process is not being executed. This produces the same advantage as that of the above embodiment.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller configured to control a vehicle, the vehicle including an internal combustion engine and an automatic transmission coupled to the internal combustion engine, and the internal combustion engine including a cylinder in which an air-fuel mixture of fuel and intake air is burned, an exhaust passage connected to the cylinder, and a three-way catalyst located in the exhaust passage, wherein
the controller is configured to execute:
a shifting process that switches a gear ratio of the automatic transmission; and
a lean operation process that operates the internal combustion engine with an air-fuel ratio of the air-fuel mixture in the cylinder leaner than a stoichiometric air-fuel ratio, and
the controller is further configured to, when executing the shifting process during execution of the lean operation process, set an air-fuel ratio in a case in which the shifting process is being executed to a value closer to the stoichiometric air-fuel ratio than an air-fuel ratio in a case in which the shifting process is not being executed.

2. The controller according to claim 1, wherein
the internal combustion engine includes a filter that traps particulate matter contained in exhaust gas, the filter being located on a downstream side of the three-way catalyst in the exhaust passage, and
the controller is configured to execute the lean operation process on condition that a deposition amount of the particulate matter trapped by the filter has increased to a predetermined specified value.

3. The controller according to claim 1, wherein the controller is configured to:
during the execution of the lean operation process, set the air-fuel ratio of the air-fuel mixture in the cylinder in the case in which the shifting process is not being executed to a first value; and
set the air-fuel ratio of the air-fuel mixture in the cylinder in the case in which the shifting process is being executed to a value closer to the stoichiometric air-fuel ratio than a median value between the stoichiometric air-fuel ratio and the first value.

4. A control method for a vehicle, the vehicle including an internal combustion engine and an automatic transmission coupled to the internal combustion engine, and the internal combustion engine including a cylinder in which an air-fuel mixture of fuel and intake air is burned, an exhaust passage connected to the cylinder, and a three-way catalyst located in the exhaust passage, the control method comprising:
executing a shifting process that switches a gear ratio of the automatic transmission;
executing a lean operation process that operates the internal combustion engine with an air-fuel ratio of the air-fuel mixture in the cylinder leaner than a stoichiometric air-fuel ratio; and
when executing the shifting process during execution of the lean operation process, setting an air-fuel ratio in a case in which the shifting process is being executed to a value closer to the stoichiometric air-fuel ratio than an air-fuel ratio in a case in which the shifting process is not being executed.

* * * * *